United States Patent

Snowdon

[15] 3,690,148

[45] Sept. 12, 1972

[54] PRESSURE TRANSDUCERS

[72] Inventor: Charles Snowdon, Tudor Cottage, Lammas Lane, Esher, Surrey, England

[22] Filed: July 22, 1970

[21] Appl. No.: 57,294

[30] Foreign Application Priority Data

July 24, 1969 Great Britain..........37,374/69

[52] U.S. Cl..................................................73/37
[51] Int. Cl..............................................G01m 3/02
[58] Field of Search......73/37, 49.1, 49.2, 49.3, 37.9, 73/37.8, 299, 300, 146; 84/330, 380

[56] References Cited

UNITED STATES PATENTS

| | | | |
|---|---|---|---|
| 2,730,920 | 1/1956 | Bacon | 84/330 X |
| 2,222,079 | 11/1940 | Larson | 73/37 |

Primary Examiner—Louis R. Prince
Assistant Examiner—William A. Henry, II
Attorney—Cushman, Darby and Cushman

[57] ABSTRACT

Measurement of the pressure between two members in contact, where at least one of the members is compliant, involves the use of a flexible tube which is open at one end, closed at the other, and has an aperture spaced between its longitudinal edges at its closed end. The tube is inserted between the two members with the tube aperture located in the region where pressure measurement is required, and fluid applied to the tube open end at progressively varied pressure until the fluid flows continuously through the aperture.

Since the aperture is otherwise effectively sealed by the two members, such flow first occurs when the applied fluid pressure equals that between the members.

9 Claims, 1 Drawing Figure

PATENTED SEP 12 1972 3,690,148
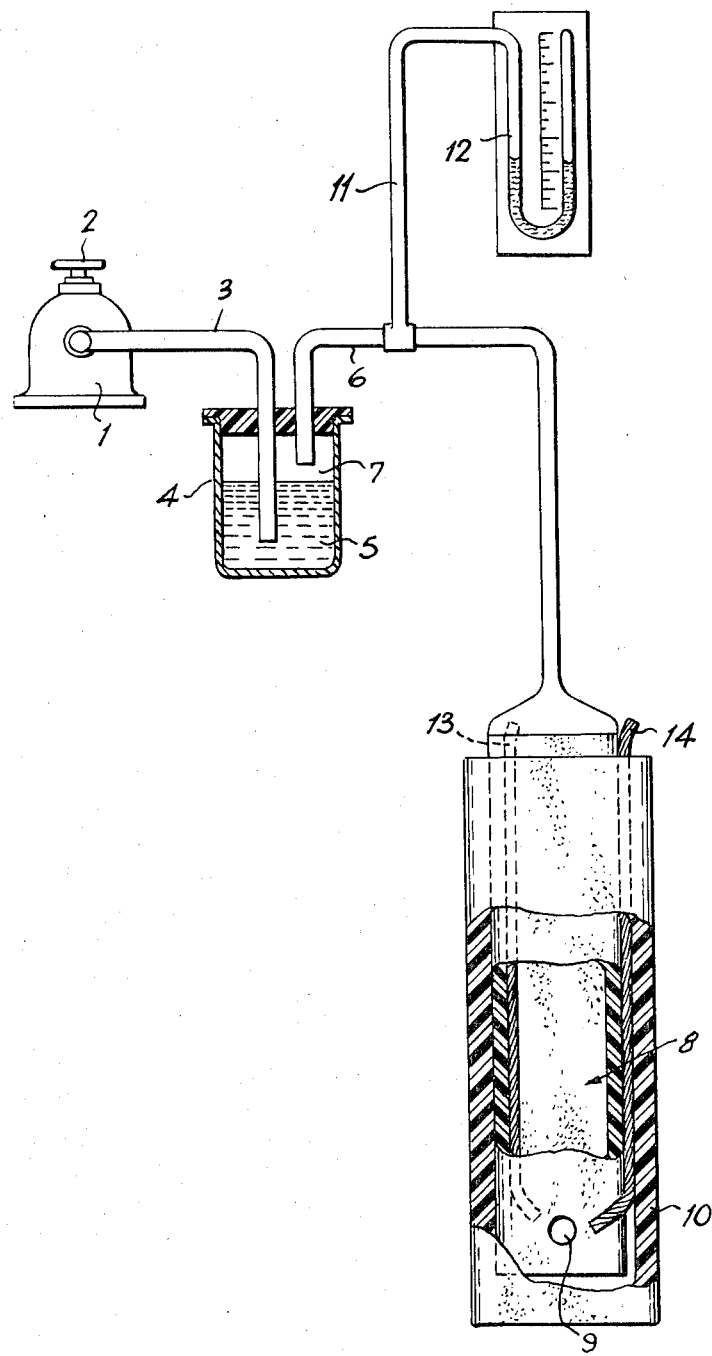

PRESSURE TRANSDUCERS

This invention concerns pressure transducers, and more particularly transducers for use in measuring the pressure between two members in contact, where at least one of the members is of a compliant nature.

The need or usefulness of such a measurement can arise in the development, manufacture or fitting of articles or garments which are to fit or conform to parts of the human body without applying undesirable pressures to the body part. One example of such a situation, which is that which has given rise to development of the present invention, involves the manufacture and fitting of stump-engaging sockets for artificial limbs. Another example involves so-called "form persuasion" garments such as corsets and the like. The difficulty in such a situation as those just discussed is that of suitably locating a pressure transducer without distorting the pressure to be measured.

An object of the present invention is to provide a pressure transducer suitable for use in such situations and, to this end, the invention provides in one aspect thereof a pressure transducer comprising a generally flat tube of flexible material, the tube being open at one end, closed at the other end, and provided with an aperture adjacent the closed end and spaced between the longitudinal edges of the tube.

While the tube material is to be flexible, it need not necessarily be elastic, and a suitable material for this purpose is latex as made in so-called "lay-flat" tube form.

In use of the invention, the tube is located in flat disposition between the two engaging materials in question with the tube aperture disposed where pressure measurement is desired and with the tube open end extending from between the engaged materials. Then fluid, and air will normally be suitable for this purpose, is applied at known pressure to the open end of the tube. Initially, the fluid will not be able to flow out of the tube by way of the aperture since the tube will be sealably constricted between the two materials in the region of the aperture. However, increase of the applied fluid pressure will reach a value which balances that constricting the aperture region, whereat fluid will flow continuously through and out of the tube. Thus, the desired pressure measurement is attained as that at which continuous through-flow first occurs.

This mode of measurement has been found to be sensitive at low pressures, down to about 0.2 inches water gauge.

From the above description it will be appreciated that the invention also provides, in another and more general aspect, a method of measuring the pressure between two members in contact, where at least one of said members is made of a compliant material, which method comprises applying pressurized fluid to the interface between said members at the periphery thereof, constraining the flow of said fluid in said region to lead to a predetermined zone of said region, varying the pressure of said applied fluid, and detecting the pressure of said applied fluid when the flow thereof first occurs substantially continuously beyond said zone.

While the invention can be operated quite satisfactorily in the simple form described above, it is possible that the tube may be constricted by a maximum pressure in a region other than that adjacent the aperture, and measurement would then be made of the former pressure. This will not occur if the tube is of such a form that its edges are only constricted by a pressure higher than the order of those encountered in use. Indeed this will often be the case and it is for this reason that the aperture is spaced between such edges. However, it may be desirable to ensure that applied fluid can reach freely to within the vicinity of the aperture. This can be achieved by use of an elongate fluid-pervious member such as a small tube, or a length of string, fabric or other pervious material within the tube from its open end to a point near, but not at, the aperture.

Also, if the transducer is to be used within a damp or wet environment, it is desirable to locate the original tube within an outer tube or sheath similar to the former but without an aperture. Such a sheath can be used alternatively, or in addition, to channel the outgoing fluid flow from the aperture for purposes of detection. In either event the same consideration of ensuring an unconstricted fluid flow path from the aperture through the sheath can be resolved as for the original tube.

Turning to the question of detecting fluid flow through the transducer: when the fluid is a gas, this can be readily effected by applying the gas to the transducer by way of a pocket of liquid. Thus, the gas will bubble continuously through the liquid when the gas pressure is in excess of the pressure at the transducer, and will bubble discontinuously as the pressure balance is detected by adjusting the gas pressure slowly so as to pass through the pressure balance region and observing the pressure at which continuous bubbling just ceases or just recommences.

One embodiment of a transducer and associated apparatus as produced during development of the present invention is schematically illustrated, by way of example, in the accompanying drawing.

The drawing is largely self-explanatory following the above description and shows an air compressor 1 provided with a manual pressure control 2. The compressor output is applied through a pipe 3 into a sealed vessel 4, with pipe 3 terminating in liquid 5 in the vessel. A further pipe 6 passes from the air space 7 within the vessel 4, through the vessel, and to the transducer tube 8 for connection with the open end of the latter. The aperture of the tube 8 is denoted at 9 and a sheath for tube 8 is shown at 10. Also, a branch pipe 11 is connected between pipe 6 and a manometer 12 to provide a measure of the applied gas pressure.

Lastly, elongate gas-pervious members are indicated at 13 and 14, the former extending within tube 8 and the latter between tube 8 and sheath 10.

I claim:

1. A method of measuring the pressure between two members in contact, where at least one of said members is made of a compliant material, which method comprises applying pressurized fluid to the interface region between said members at the periphery thereof, constraining the flow of said fluid in said region to lead to a predetermined zone of said region, varying the pressure of said applied fluid, and detecting the pressure of said applied fluid when the flow thereof first occurs substantially continuously beyond said zone.

2. A pressure transducer comprising a generally flat tube of flexible material, the tube being open at one end, closed at the other end, and provided with an aperture adjacent the closed end and spaced between the longitudinal edges of the tube; an elongate fluid pervious member extending within said tube between the open end thereof and a position adjacent to, but spaced from, said aperture.

3. A transducer according to claim 2 comprising: a further generally flat tube of flexible material, open at one end, closed at the other end, and dimensioned to permit insertion of the first-mentioned tube in the second tube with the latter serving as a sheath for the former and the two tubes similarly orientated in respect of their open and closed ends; and a further elongate fluid pervious member extending between said tubes and between the open ends thereof and a position adjacent to, but spaced from, said aperture.

4. Apparatus according to claim 3 wherein said measuring means is a manometer connected to the applied gas path between said liquid trap and said transducer.

5. A pressure transducer comprising a generally flat tube of flexible material, the tube being open at one end, closed at the other end, and provided with an aperture adjacent the closed end and spaced between the longitudinal edges of the tube; said tube being made from "lay-flat" tubular latex material.

6. A pressure transducer comprising a generally flat tube of flexible material, the tube being open at one end, closed at the other end, and provided with an aperture adjacent the closed end and spaced between the longitudinal edges of the tube; a further generally flat tube of flexible material, open at one end, closed at the other end, and dimensioned to permit insertion of the first-mentioned tube in the second tube with the latter serving as a sheath for the former and the two tubes similarly orientated in respect of their open and closed ends.

7. A transducer according to claim 6 comprising a further elongated fluid pervious member extending between said tubes and between the open ends thereof and a position adjacent to, but spaced from, said aperture.

8. A transducer according to claim 6 wherein said further tube is made from "lay-flat" tubular latex material.

9. Apparatus for measuring the pressure between two members in contact, where at least one of said members is made of a compliant material, which apparatus comprises: a pressure transducer for location in the interface region between said members, said pressure transducer comprising a generally flat tube of flexible material, the tube being open at one end, closed at the other end, and provided with an aperture adjacent the closed end and spaced between the longitudinal edges of the tube, the tube open end extending from said interface region and said aperture being located at a zone where pressure is to be measured; means for applying gas at adjustable pressure through a liquid trap to the open end of the first-mentioned tube of said transducer without gas loss from said open end; and means for measuring the applied gas pressure when the applied gas first bubbles continuously through said gas trap.

* * * * *